United States Patent [19]

Subramanian

[11] Patent Number: 5,361,276
[45] Date of Patent: Nov. 1, 1994

[54] ALL DIGITAL MAXIMUM LIKELIHOOD BASED SPREAD SPECTRUM RECEIVER

[75] Inventor: Ravi Subramanian, East Brunswick, N.J.

[73] Assignee: AT&T Bell Laboratories, Murray Hill, N.J.

[21] Appl. No.: 119,682

[22] Filed: Sep. 13, 1993

[51] Int. Cl.$^5$ ............................................ H04L 27/30
[52] U.S. Cl. .......................................... 375/1; 380/34; 375/99; 375/111; 455/63; 455/65; 455/296; 455/302
[58] Field of Search ................... 375/99, 111, 114, 115, 375/119, 120, 1, 34; 455/50.1, 62, 63, 65, 67.1, 67.3, 68–71, 296, 302

[56] References Cited

U.S. PATENT DOCUMENTS 4,359,779 11/1982 Levine .................................. 375/1 X
4,621,365 11/1986 Chiu ........................................ 375/1

*Primary Examiner*—Bernarr E. Gregory

[57] ABSTRACT

A spread spectrum receiver for use in spread spectrum communication systems is disclosed. The spread spectrum receiver of the present invention includes an analog-to-digital converter for receiving an analog spread spectrum signal, and for converting the received analog signal to a digital signal. The spread spectrum receiver also includes a digital frequency offset correction device, for modifying the digital signal in accordance with a frequency correction term signal to thereby correct for frequency offset in the received analog signal. The spread spectrum receiver also contains a Rake receiver. The spread spectrum receiver searches through the modified digital signal to identify M of the main and multipath return signals having the strongest signal strengths. The identified main and multipath return signals are processed in accordance with predetermined maximum likelihood techniques to thereby generate phase correction and maximal-ratio combining weighting factors for each of the M signals, as well as the overall frequency correction term signal.

10 Claims, 7 Drawing Sheets

ALL DIGITAL MAXIMUM LIKELIHOOD BASED SPREAD SPECTRUM RECEIVER

BACKGROUND OF THE INVENTION

1. Field of the Invention

The present invention relates generally to communication systems, and more particularly to receivers for use in spread spectrum communication systems.

2. Related Art

In the past, direct-sequence spread-spectrum techniques have not been widely used due to their relatively high cost. However, the recent development and use of custom digital VLSI (very large scale integration) techniques have made the cost of spread-spectrum signal processing affordable. Consequently, direct-sequence spread-spectrum techniques have received much attention in the last few years as a viable technological option for many commercial applications, such as for commercial portable mobile communication systems.

Conventionally, spread-spectrum transceiver components are implemented in an economic manner using application-specific integrated circuit (ASIC) chips. The use of ASIC chips in spread spectrum transceiver components has heretofore been deemed necessary due to the rather unique signal processing requirements associated with spread spectrum communication. In particular, in a spread-spectrum receiver, the design philosophy is to tolerate interference. Designing to tolerate interference results in a higher quality radio, and can lead to an increase in the network capacity. As will be appreciated, such design philosophy associated with spread-spectrum receivers generally differs from the design philosophy employed when developing conventional narrowband radios.

As a result of the rather unique signal processing requirements associated with spread spectrum communication, in the past it has not been possible to employ standard digital signal processing techniques when developing spread-spectrum receivers. This represents a disadvantage of conventional spread-spectrum receivers, since digital signal processing techniques offer the ability to employ powerful signal conditioning and processing algorithms that give rise to robust receivers. Consequently, generic, general purpose spread spectrum digital signal processors (DSP) do not currently exist.

SUMMARY OF THE INVENTION

The present invention is directed to a spread spectrum receiver for use in a spread spectrum communication system. The receiver of the present invention includes an analog-to-digital converter for receiving an analog spread signal, and for converting the received analog signal to a digital signal. The received analog signal includes a plurality of main and multipath return signals of varying signal strengths. The spread spectrum receiver also includes a Rake receiver, and a frequency offset correction device, coupled to the analog-to-digital converter, for modifying the digital signal in accordance with a frequency correction term signal to thereby correct for frequency offset in the received analog signal.

The spread spectrum receiver searches through the modified digital signal to identify M of the main and multipath return signals having the strongest signal strengths. The identified main and multipath return signals are processed in accordance with predetermined maximum likelihood techniques to thereby generate the maximal-ratio-combining weighting factor, carrier phase correction term, and the frequency correction term signal.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein.

DETAILED DESCRIPTION OF THE PREFERRED EMBODIMENTS

1. Overview of the Present Invention

Figure 1:
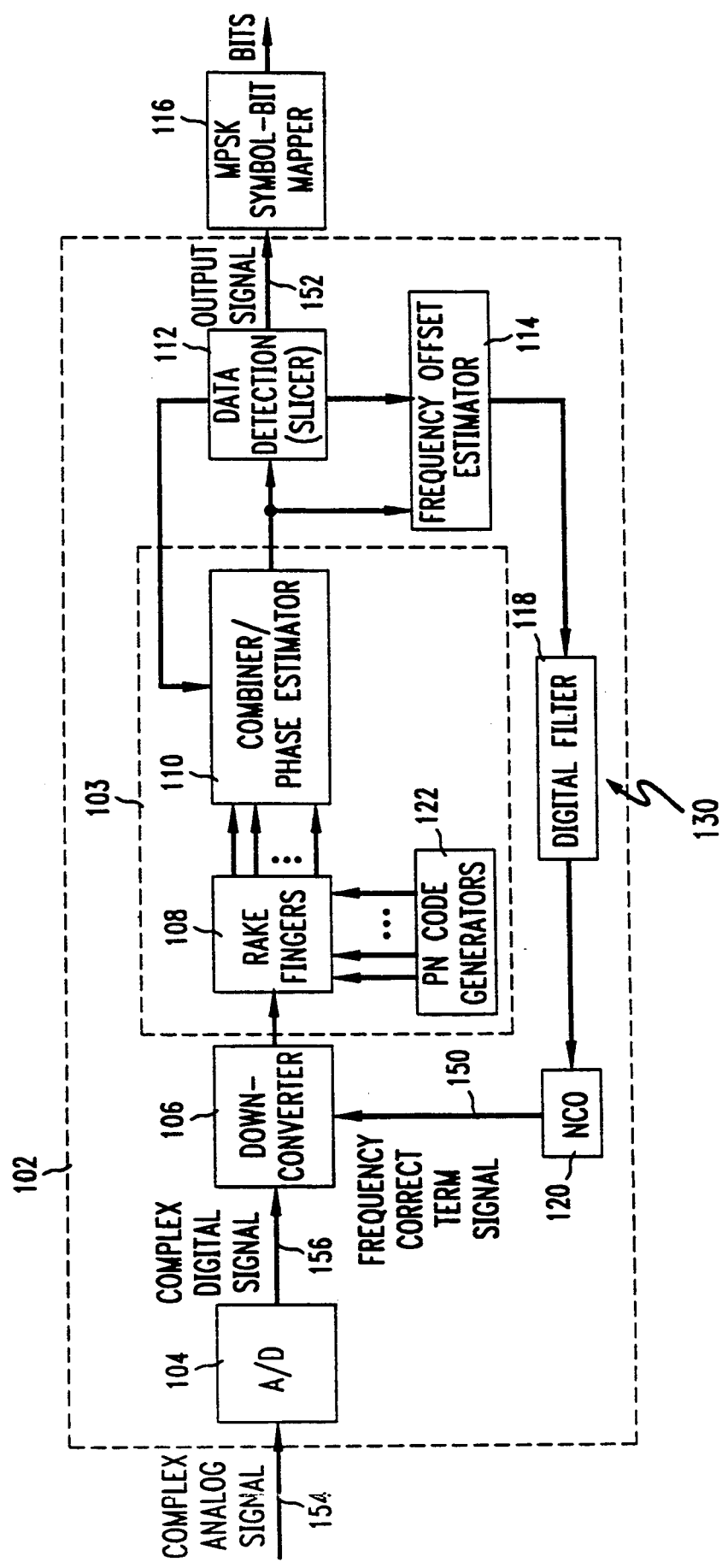
FIG. 1 is a structural block diagram of a spread spectrum receiver in accordance with a preferred embodiment of the present invention.

The present invention is directed to a completely digital, preferably MPSK (multiple phase shift keying) direct-sequence spread-spectrum receiver. The spread spectrum receiver of the present invention is preferably used with CDMA (Code-Division Multiple Access) cellular and cordless telephone applications, although the spread spectrum receiver of the present invention is adapted for use with other types of communication applications.

Preferably, the spread spectrum receiver of the present invention is implemented using various digital algorithms for phase estimation, frequency estimation, Rake diversity combining, and PN (pseudo noise) code tracking based on maximum-likelihood (ML) principles. These algorithms have a low numerical complexity and a computational structure that results in a very regular receiver architecture.

2. Description of the Signal Received by the Spread Spectrum Receiver

The complex analog signal which is transmitted to and received by the spread spectrum receiver of the present invention is described in this section. The manner in which this complex analog signal is generated and transmitted to the spread spectrum receiver is also described in this section.

Spread-spectrum communication is described in many publicly available documents, such as *Digital Communications* by Proakis (New York, McGraw Hill, 1989) and *Spread-Spectrum Communications* by Simon et al. (Computer Science Press, 1989). As is well known, spread spectrum communication signals used for the transmission of digital information are characterized by their large bandwidth W, which is much greater than the information rate R in bits per second. Thus, the bandwidth expansion factor L=W/R for a spread spectrum signal is much greater than unity. The large redundancy inherent in these signals is required to overcome the severe levels of interference that are encountered in the transmission of digital information over some radio and satellite channels. In addition, the pseudo-random structure of the signals makes them appear similar to random noise and difficult to demodulate by receivers other than the intended ones.

Direct-sequence spread-spectrum (DS-SS) modulation is generally well known. In DS-SS, a carrier is modulated first by a pseudorandom waveform, also called pseudo noise (PN) waveform, before modulation by a data stream. The PN waveform consists of a sequence of bits (called chips), each of duration $T_c < T_b$ (where $T_c$=period of one chip, and $T_b$=period of one symbol, or baud). Usually, one bit period contains up to several hundred chips. The transmitted direct-sequence spread-spectrum signal s(t) can be written as follows:

$$s(t) = \sqrt{E_s/T_b}\, d(t)c(t)e^{j\omega_o t}$$

where $$d(t) = \Sigma\, d_k p_1(t - kT_b)$$

and $$c(t) = \sum_l c_l p_2(t - kT_b - lT_c)$$

$d_k$ takes on values $\{e^{j 2\pi m/M}\}$, where $0 \leq m \leq M-1$ (for M-ary PSK), with symbol period $T_b$ seconds. $\omega_o$ denotes the carrier frequency, $E_s$ is the signal energy, and $c_k$ is a $\pm 1$-valued, L-chip-long spreading (PN) code with chip time $T_c = T_b/L$ seconds. The original data spectrum is thus spread out in frequency by a factor of L, resulting in a spread-spectrum signal. The process of multiplying the transmitted data by the PN code is conventionally called spreading the signal. The waveforms $p_1(t)$ and $p_2(t)$ are a rectangular pulse waveform and a chip pulse-shaping waveform.

The signal passes through a fading multipath channel which is described in many publicly available documents, such as "Introduction to Spread-Spectrum Antimultipath Techniques and Their Applications to Urban Digital Radio" by Turin (*Proc. IEEE*, vol. 68, pp. 328–353, 1980), which is herein incorporated by reference. r(t), which is received by the spread spectrum receiver of the present invention, is a complex analog signal. After demodulation (not phase-locked, the signal r(t) is represented as follows:

$$r(t) = \sum_{i=1}^{D} h_i(t) \sqrt{E_s/T_b}\, d(t -$$

$$\tau_i - \xi T_c)c(t - \tau_i - \xi T_c)e^{j(2\pi \Delta f t + \phi)} + n(t)$$

where $\Delta f$ s the frequency offset, $\phi$ is a random initial phase, n(t) represents noise plus any other interference introduced through the channel, and $\xi T_c$ is the received code offset with respect to an arbitrary time reference. The complex fading process on the $i^{th}$ multiple path is characterized by the complex phaser $h_i(t) = a_i e^{j\theta_i}$, where $a_i$ and $\theta_i$ can vary slowly with time. The delay of the $i^{th}$ channel is characterized by $\tau_i$.

3. Structure and Operation of the Spread Spectrum Receiver

The structure and operation of the spread spectrum receiver of the present invention shall now be described in detail.

FIG. 1 is a block diagram of a spread spectrum receiver 102 in accordance with a preferred embodiment of the present invention. The receiver 102 includes an analog to digital (A/D) converter 104, a down converter 106, a Rake receiver 103, and a data detection device (also called slicer) 112. The slicer 112 generates an output signal 152 which is transferred to a MPSK symbol-to-bit (symbol-bit) mapper 116, which is not part of the receiver 102 of the present invention. The Rake receiver 103 includes M Rake fingers 108 (also called Rake arms), pseudo noise (PN) generators 122, and a multipath diversity combiner/phase estimator 110.

The receiver 102 also includes a digital feedback loop 130 which operates to generate a signal 150 representing a frequency correction term. The frequency correction term signal 150 is transferred to the down converter 106, as further described below. The digital feedback loop 130 includes a frequency offset estimator 114, a digital filter 118, and a digital numerically controlled oscillator (NCO) 120.

Figure 3:
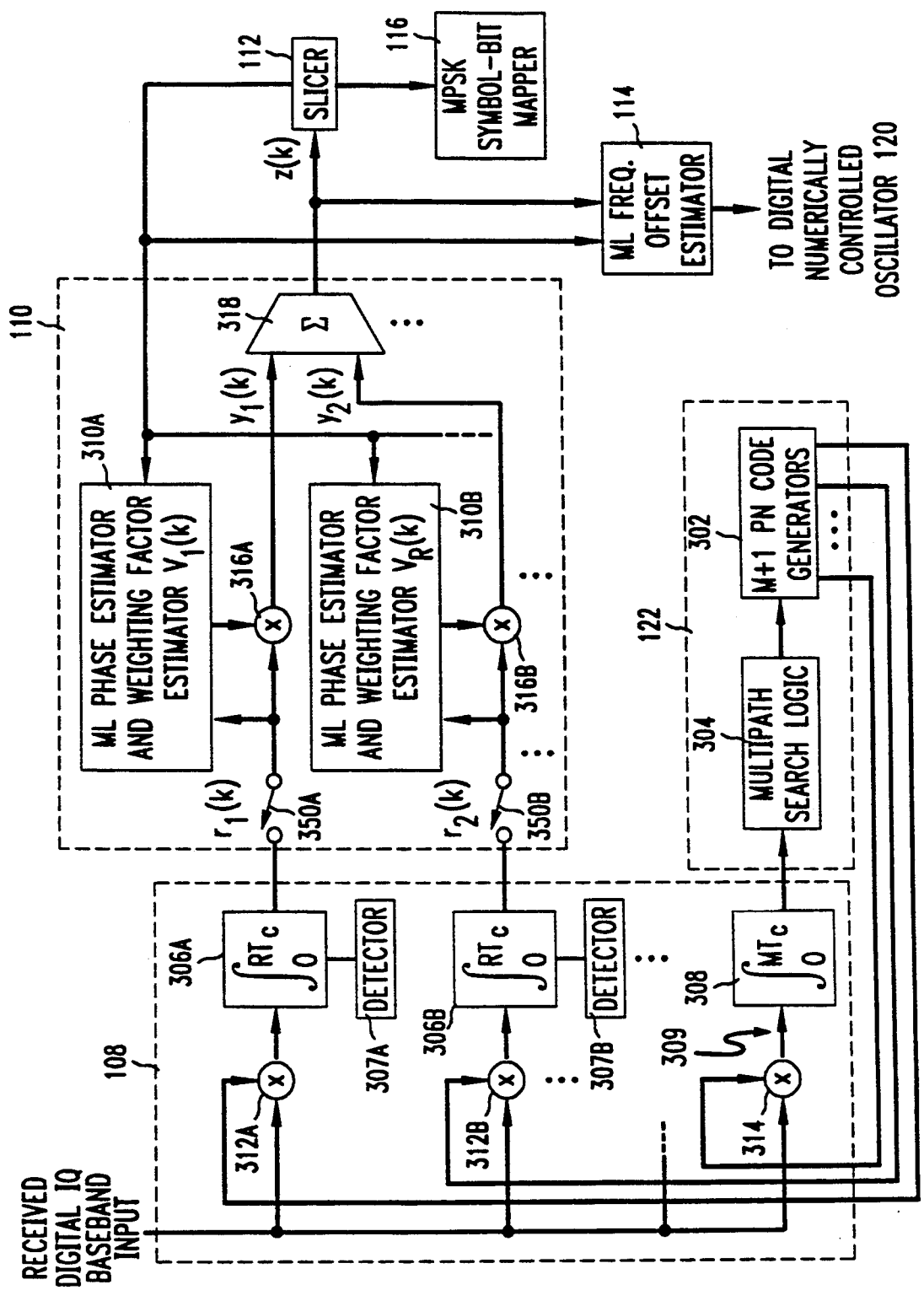
FIG. 3 is a more detailed structural block diagram of a portion of the spread spectrum receiver of FIG. 1.

FIG. 3 is a more detailed block diagram of a portion of the receiver 102. In particular, FIG. 3 illustrates in block diagram form the structure and data flow characteristics of the Rake fingers 108, the multipath diversity combiner/phase estimator 110, and the PN code generators 122. Also shown in FIG. 3 is the slicer 112, the frequency offset estimator 114, and the MPSK symbol-bit mapper 116.

Figure 7:
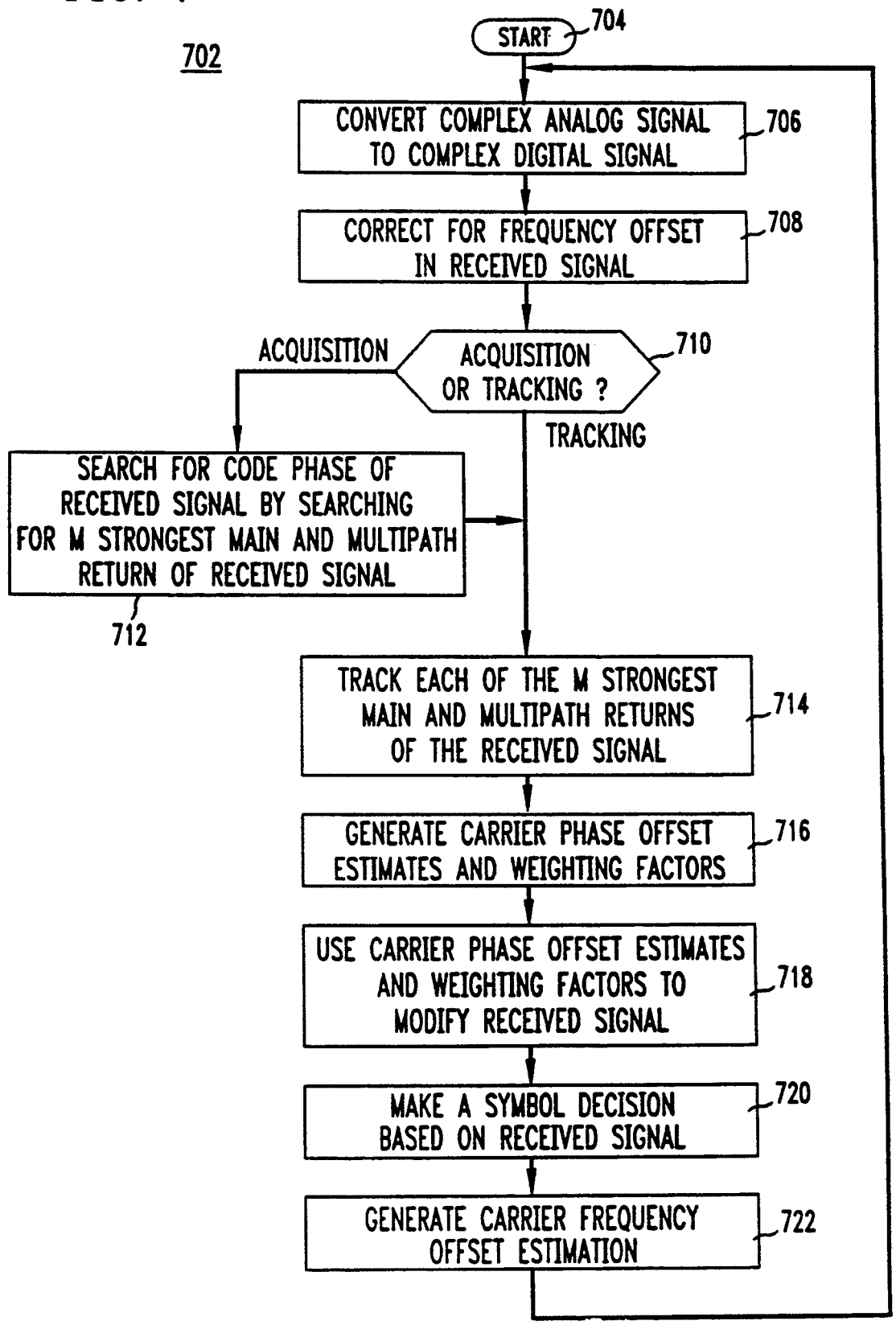
FIG. 7 illustrates a flowchart depicting the preferred general operation of the spread spectrum receiver of the present invention.

The operation of the spread spectrum receiver 102 of the present invention shall now be described with reference to FIG. 7, which illustrates a flowchart 702 depicting the operation of the present invention. The flowchart 702 begins with step 704, where control immediately passes to step 706.

In step 706, the analog to digital (A/D) converter 104 receives a complex analog signal 154 (described above). The A/D converter 104 converts the complex analog signal 154 to a complex digital signal 156. Step 706 is further described in a subsequent portion of this document with reference to step 406 in FIGS. 4A and 4B.

As will be appreciated, the frequency of the signal received by the receiver 102 may be offset from the frequency of the signal originally transmitted. This frequency offset may be due to a number of reasons. For example, the frequency offset may result if the reference frequency at the receiver 102 differs from the reference frequency at the transmitter (not shown). The frequency offset may result if the receiver 102 or transmitter (not shown) is moving through space, thereby creating a doppler frequency offset. Also, the frequency offset may be due to drift in the reference frequency oscillator (not shown) of the receiver 102.

In step 708, the downconverter 106 receives the complex digital signal 156, and modifies the complex digital signal 156 to correct for frequency offset in the signal received by the receiver 102. Preferably, the downconverter 106 performs frequency offset correction by modifying the complex digital signal 156 using a frequency correction term signal 150 generated by a digital feedback loop 130 (described below). Step 708 is further described in a subsequent portion of this document with reference to step 408 in FIGS. 4A and 4B.

The local PN code generators 122 must be synchronized with the phase of the incoming code. Such synchronization requires both acquisition and tracking systems in order to rapidly acquire an unknown code phase, and then track the code phase to within a fraction of a chip. Acquisition is preferably performed using a multipath search algorithm described below), which is preferably implemented using one of the Rake fingers 108. Preferably, Rake finger 309 is used. Rake finger 309 is hereinafter referred to as the acquisition Rake finger 309.

Accordingly, in step 710, the receiver 102 determines whether to enter an acquisition mode or a tracking mode. It is noted that synchronization and all subsequent operations significantly suffer in the presence of any large frequency offsets. Thus, before performing step 710, the receiver 102 performs step 708 wherein the downconverter 106 compensates for any possible frequency offset in the received signal (as described above). Step 710 is further described in a subsequent portion of this document with reference to step 412 in FIGS. 4A and 4B.

If, in step 710, the receiver 102 decides to enter the acquisition mode, then step 712 is performed. In step 712, the acquisition Rake finger 309 in conjunction with the PN code generators 122 searches for the code phase of the received signal by searching for the M strongest main and multipath returns of the received signal. A correlation operation is preferably utilized to perform step 710.

More particularly, in step 710 the receiver 102 estimates the M strongest main and multipath returns of the received signal. This involves observing the received signal over a period of time, which is preferably W chip-periods in duration, and selecting the M signal paths based on the signal strength. The result of this estimation procedure is a list of ordered pairs $\hat{\tau}_i, \hat{a}_i$, corresponding to the receiver's estimate of the actual multipath delays $\tau_i$, and their relative weights $a_i$, where $i=1,2,\ldots M$. The receiver 102 then uses these $\tau_i$ estimates to drive M code generators, which feed the Rake fingers 108, thereby despreading the aggregate received signal M times, each Rake despreading arm (or fingers) corresponding to a different code phase. Step 712 is further described in a subsequent portion of this document with reference to steps 414–418 in FIGS. 4A and 4B.

If, in step 710, the receiver 102 decides to enter the tracking mode, then the series of steps beginning with step 714 are performed. These steps are also performed after step 712 is performed.

Code tracking is performed during step 714. Specifically, in step 714, the Rake fingers 108 continuously maintain the best possible waveform alignment by means of a closed loop operation. Specifically, each of the M Rake fingers 108 tracks the respective code to within a fraction of a chip. Step 714 is further described in a subsequent portion of this document with reference to step 420 in FIGS. 4A and 4B.

In steps 716 and 718, the receiver 102 modifies the received signal such that the slicer 112 can make a symbol decision. Preferably, the receiver 102 modifies the received signal in this manner using maximum likelihood techniques. Specifically, in step 716 the combiner/phase estimator 110 uses maximum likelihood techniques to estimate carrier phase estimates and maximal-ratio combining weighting factor estimates. In step 718, the combiner/phase estimator 110 uses the carrier phase estimates and weighting factor estimates to modify the received signal such that the slicer 112 can make a symbol decision. Steps 716 and 718 are further described in a subsequent portion of this patent document with reference to steps 426 and 428 in FIGS. 4A and 4B.

In step 720, the slicer 112 processes the signal produced by the combiner/phase estimator 110 and makes a symbol decision. Step 720 is further described in a subsequent portion of this patent document with reference to steps 430 and 438 in FIGS. 4A and 4B.

In step 722, the frequency offset estimator 114 uses maximum likelihood techniques to generate a carrier frequency offset estimation using the signal produced by the combiner/phase estimator 110. This carrier frequency offset estimation is processed by the digital filter 118 and the NCO 120 and is transferred to the downconverter 106, which uses the processed carrier frequency offset estimation (also called the frequency correction term signal 150) to correct for frequency offset in the received signal (discussed above in step 708). Step 722 is further described with reference to steps 432–436 in FIGS. 4A and 4B.

Figure 4A:
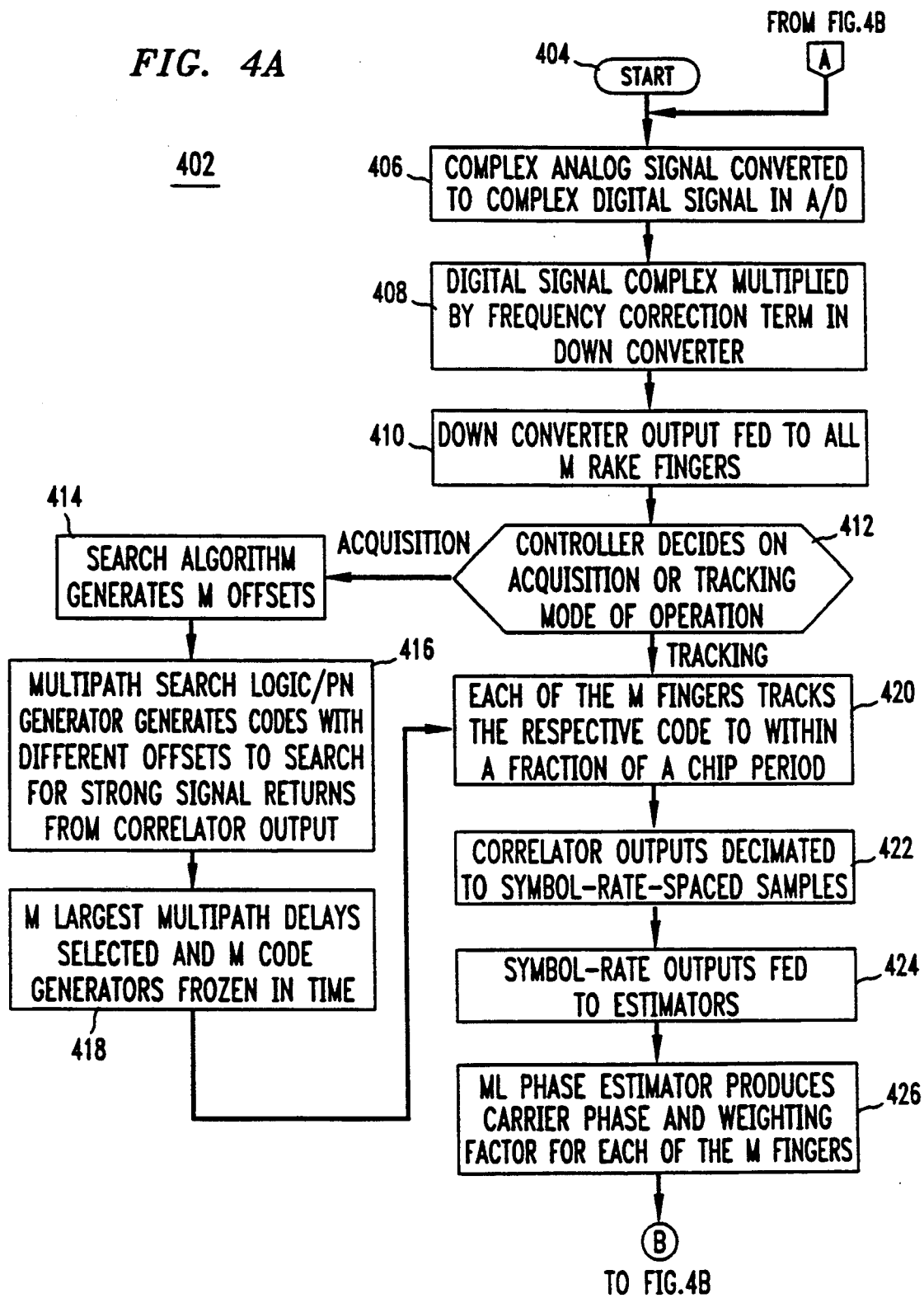
FIGS. 4A and 4B collectively illustrate a flowchart depicting the preferred detailed operation of the spread spectrum receiver of the present invention.
Figure 4B:
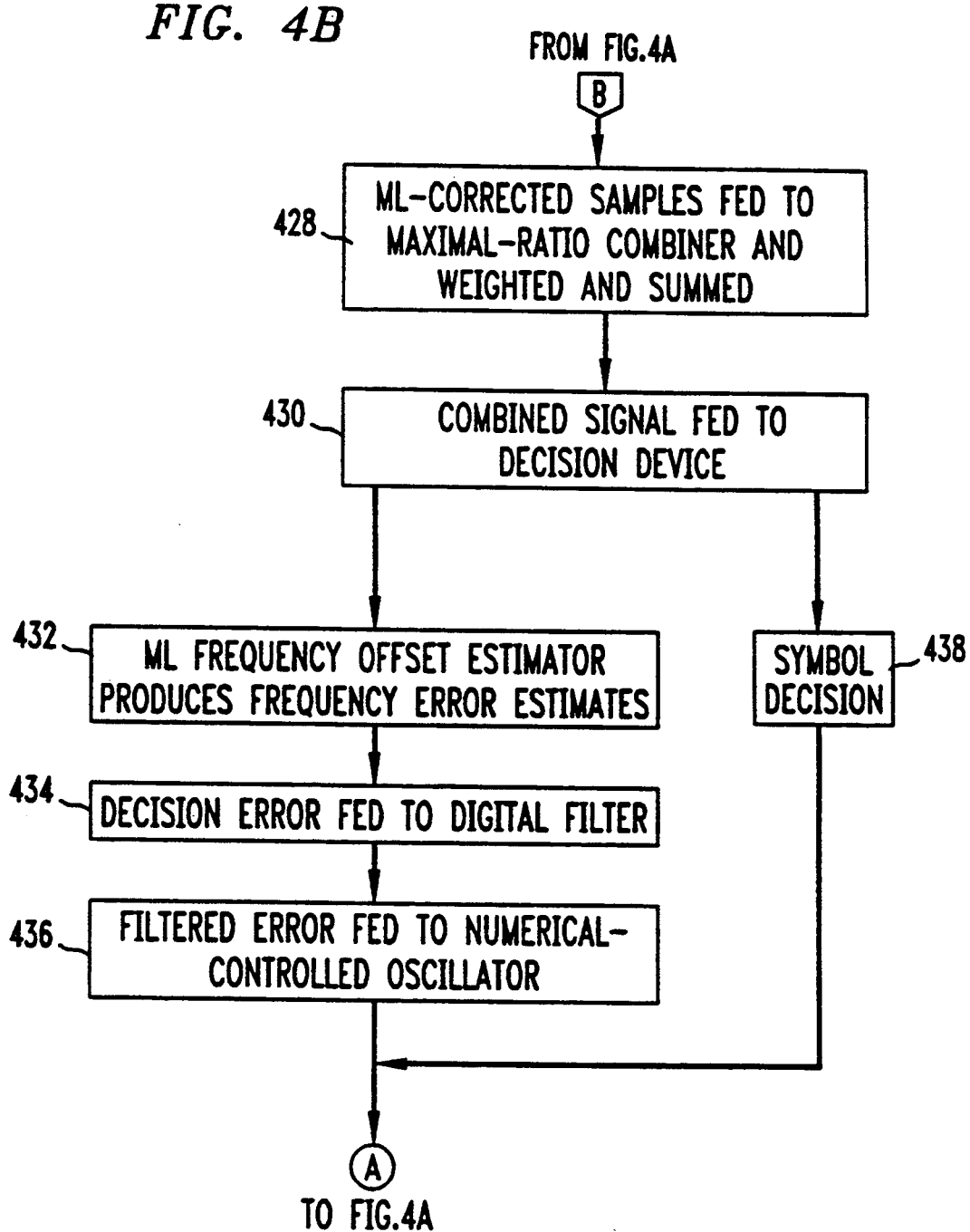

The operation of the spread spectrum receiver 102 of the present invention shall now be described in greater detail with reference to FIGS. 4A and 4B. FIGS. 4A and 4B collectively illustrate a flowchart 402 depicting the operation of the present invention.

The flowchart 402 begins with step 404, where control immediately passes to step 406.

In step 406, the analog to digital (A/D) converter 104 receives a complex analog signal 154 (described above). As is well known, complex signals may be represented in the digital domain as in-phase and quadrature components, or as amplitude and/or phase components. It often proves useful to convert between the two while performing certain functions (see Viterbi et al., "Nonlinear Estimation of PSK-Modulated Carrier Phase with Application to Burst Digital Transmission," *IEEE Trans. on Info. Theory*, pp. 543–551, 1983). For illustrative purposes only, the complex signals discussed herein are considered using the I/Q (in-phase/quadrature) signal representation unless stated otherwise.

The A/D converter 104 converts the complex analog signal 154 to a complex digital signal 156. Specifically, the A/D converter 104 over-samples the I/Q signals 154 at preferably several times chip rate. In accordance with the Nyquist theory, the minimum sampling rate required to accurately bring the analog spread-spectrum signal 154 into the digital domain is $2/T_c$ (i.e., 2 samples per chip period).

The complex digital signal 156 generated by the A/D converter 104, and which is eventually received by the Rake fingers 108 (after processing by the downconverter 106), can be written as follows:

$$r(k) = \sum_{i=1}^{D} h_i(kT_s) \sqrt{E_s/T_b} \; d(kT_s -$$

$$\tau_i - \xi T_c)c(kT_s - \tau_i - \xi T_c)e^{j(2\pi \Delta f kT_s + \phi)} + n(kT_s)$$

Preferably, symbol decisions are made on the output of the Rake fingers 108 at the symbol rate $T_b$. From the A/D converter 104 to the output of the Rake fingers 108, the sample rate is preferably at $M/T_c$, whereas after the Rake fingers 108 the sample rate is preferably at $1/T_b$, the symbol rate.

In step 408, the downconverter 106 receives the complex digital signal 156. The downconverter 106 is responsible for automatically controlling the frequency of the complex digital signal 156. In other words, the downconverter 106 performs frequency offset correction. Preferably, the downconverter 106 performs frequency offset correction by modifying the complex digital signal 156 using a frequency correction term signal 150 generated by the digital feedback loop 130 (described below). Preferably, the downconverter 106 complex multiplies the complex digital signal 156 using the frequency correction term signal 150 to perform frequency offset correction.

In step 410, the output signals from the downconverter 106 are transferred to each of the Rake fingers 108. As best shown in FIG. 3, each of the Rake fingers 108 comprises a multiplier 312 and an integrator 306, the combination of which is also called a correlator.

Rake communication systems and components are generally well known, and are described in many publicly available documents such as "Introduction to Spread-Spectrum Antimultipath Techniques and Their Applications to Urban Digital Radio" by Turin, referenced above. The Rake receiver 103 of the present invention is similar to conventional Rake receivers, except that the Rake receiver 103 of the present invention operates with feed-forward and feedback estimators 114 and 310. Also, the Rake receiver 103 is preferably implemented with all digital components. As noted above, one finger 309 of the Rake receiver 103, comprising a multiplier 314 and a correlator 308, is reserved for code synchronization operations. Specifically, this acquisition Rake finger 309 performs multipath search and acquisition operations. The operation of the Rake receiver 103 is further described below after first considering Step 412.

Step 412 is performed after the output signals from the downconverter 106 are transferred to the Rake fingers 108 in step 410. In step 412, a synchronization mode is entered. In accordance with a preferred embodiment of the present invention, the process of synchronization is accomplished in two stages: a code acquisition stage and a code tracking stage.

When power is first applied to the receiver 102, the controller determines that receiver 102 should enter the code acquisition stage. Once the received PN sequences are aligned with the local PN sequences to within a small relative timing offset (such alignment is described below), the controller determines that the Rake finger corresponding to the selected code phase should enter the code tracking stage. As long as such alignment is maintained over M fingers, the overall receiver 102 stays in the code tracking stage. If such alignment is loss, the controller determines that receiver 102 should re-enter the code acquisition stage.

Systems and methods for determining whether to enter an acquisition mode or a tracking mode are well known, and any of these well known systems and methods may be used in conjunction with the receiver 102 of the present invention. Preferably, the controller determines whether to enter an acquisition mode or a tracking mode as follows.

When the receiver 102 is turned on, one correlator 309 is used in conjunction with a search algorithm (described herein) to search for code phases that correspond to different multipaths. Based on threshold testing output by the correlator, the controller either sets a Rake finger into acquisition mode or tracking mode. Once in tracking mode, a second threshold test, together with an averaging process, is used to determine whether to stay tracked or return to acquisition mode.

If, in step 412, the controller determines that the receiver 102 should enter the acquisition mode, then steps 414–418 are performed. During the acquisition mode (that is, during the processing of steps 414–418), the acquisition Rake finger 309 aligns the received PN sequences (that is, the PN sequences originally contained in the complex analog signal 154) with local PN sequences generated by the M PN code generators 302. The received PN sequences are aligned with the local PN sequences to within a small relative timing offset, preferably less than a fraction of a code chip.

More particularly, during the acquisition mode the acquisition Rake finger 309 interacts with the PN code generators 122 to estimate the M strongest paths. This involves observing the received signal r(t) 154 (as processed by the A/D converter 104 and the downconverter 106) over a period of time (preferably W chip-periods in duration), and selecting the M signal paths based on the signal strength. The result of this estimation procedure is a list of ordered pairs $(\hat{\tau}_i, \hat{a}_i)$, corresponding to the acquisition Rake finger 309's estimate of the actual path delays $\tau_i$ and their relative weights $a_i$, where $i = 1, 2, \ldots M$. During this process, the acquisition Rake finger 309 operates in a multipath search mode and a freeze mode.

Steps 414–418 shall now be described in detail.

In step 414, the controller (not shown) employs a multipath search algorithm (described below) to generate M code phase offsets. These M offsets are fed to M PN code generators 302. Specifically, during step 414, the acquisition Rake finger 309 operates in a multipath search mode. During the multipath search mode, the PN code generator 302 associated with the acquisition Rake finger 309 selects a reference phase $\tau_0$ (that is, the code phase corresponding to the main received path), and tests the code phases $\tau_0 + k\Delta\tau$. k varies over the values $1, 2, \ldots WT_c/\Delta\tau$, so that a window of delays up to duration W chip periods is covered. For each delay value tested, the acquisition Rake finger 309 dwells on this phase for several chip periods. The value generated by the acquisition Rake finger 309 is first threshold compared, and then compared to the delays that yielded the M largest signals. The M largest delays $\hat{\tau}_i$ are stored in a random access memory (RAM), not shown. This continues for all $WT_c/\Delta\tau$ values of k (chosen by the search algorithm). Steps 416 and 418 pertain to stepping through the possible values of k.

In step 416, the multipath search logic/PN generator 304, 302 generates codes with different offsets, and then uses these codes to search for strong signal returns from the output of the acquisition Rake finger 309. In order to test a possible code phase position, exactly $DT_c$ seconds are required. D is a predetermined, implementation dependent, integer value. At the end of $DT_c$ seconds, the result in the acquisition Rake finger 309 is dumped to a register 608 (see FIG. 6). At this point, $DT_c$ seconds of the received signal has been lost to the receiver 102. The next value of delay $\hat{\tau}_i$ that is tested uses the next $DT_c$ seconds of the signal. Which values of $\hat{\tau}_i$ that are tested depends on the search strategy (as described above), which is preferably microcoded. The only signal processing hardware necessary to perform step 416 is the acquisition Rake finger 309, with some associated control logic to implement the search strategy. Only the M delays $\hat{\tau}_i$ that yielded the largest correlations are stored in RAM. As a result of step 416, the PN code generators 302 for each Rake arm have the code timing information necessary to generate a local code with the proper code phase so that M-branch processing and multipath combining can take place.

In step 418, the M largest multipath delays are selected and the M code generators 302 are frozen in time (that is, are placed in the freeze mode). In the freeze mode, the search circuitry may be shut down to save power. Specifically, during step 418, the delays $\hat{\tau}_i$ from step 416 are used to drive the M code generators 302 to generate local PN code sequences. These local PN code sequences are feed to the Rake fingers 108. This results in despreading the aggregate received signal M times, wherein each Rake despreading finger 108 corresponds to a different multipath delay.

If, in step 412, the controller determines that the receiver 102 should enter the tracking mode, then the series of steps starting with step 420 are performed. These steps are also performed after step 418 has been completed.

Code tracking is performed during step 420. Specifically, in step 420, the Rake fingers 108 continuously maintain the best possible waveform alignment by means of a closed loop operation. Specifically, each of the M Rake fingers 108 tracks the respective code to within a fraction of a chip.

Any well known code tracking system and/or method can be used to perform step 420 of the present invention. Preferably, however, code tracking in step 420 is performed using a tracking circuit in combination with a noncoherent peak detector 502. The tracking circuit comprises a threshold detector 307 in each of the Rake fingers 108.

Figure 5:
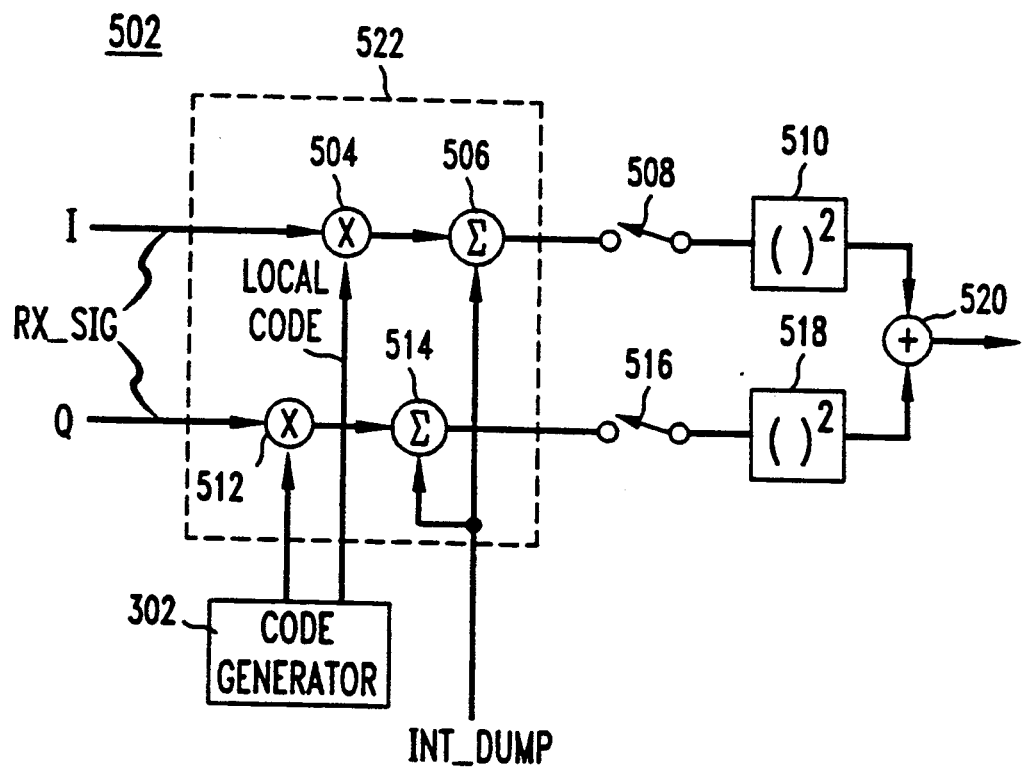
FIG. 5 is a structural block diagram of a noncoherent peak detector in accordance with a preferred embodiment of the present invention.

FIG. 5 is a block diagram of the peak detector 502. The peak detector 502 includes a non-coherent I/Q correlator 522, which has three inputs. The I/Q correlator 522 represents the multiplier 314/integrator 308 combination in the acquisition Rake finger 309. A LOCAL_CODE signal is generated by the code generator 302 and represents a locally generated replica of the received code, accurate to within $T_c/2$. LOCAL_CODE has 1-bit samples spaced $T_c$ apart. A RX_SIG signal represents the received signal, and is stored in RAM (not shown) as two B-bit samples (I,Q) spaced $I/T_c$ apart. A INT_DUMP signal is a binary waveform that provides timing information on when to begin the integration operation and when to dump the result (latch) into a register (not shown).

The output of the peak detector 502 is a statistic, $S_i^2 + S_q^2$, which is the sum of the squares of the in-phase and quadrature correlator outputs. In the tracking mode, the Rake receiver 103 picks one of the M possible fractional-$T_c$ phases of the received signal that corresponds to a peak out of the noncoherent peak detector 502. This peak appears every symbol period. When the tracking circuit is locked to the correlator output peaks, a window is used by the detector 502 to select decision samples and to thus derive the code sequence timing so as to make small tracking corrections to a code sequence generator clock (not shown), if necessary. Within the window, a threshold test is performed by the threshold detectors 307 using adaptive threshold controls, and the result of the threshold test is used to either select another timing phase or to keep the timing phase unchanged.

A tracking circuit employing a noncoherent peak detector is further described in "Synchronization Systems for Spread-Spectrum Receivers" by Subramanian (Ph.D. Thesis, EECS Department, University of California, Berkeley, 1991), which is herein incorporated by reference in its entirety.

Referring again to FIGS. 4A and 4B, in step 422, the output signals from the Rake fingers 108 are decimated (that is, the sampling rates are changed) to symbol rate spaced samples by the samplers 350.

In step 424, the output signals from the samplers 350 are transferred to the maximum likelihood (ML) phase and weighting factor estimators 310. The output signals from the samplers 350 are also transferred to the multipliers 316.

In step 426, the ML phase estimators 310 each produces a carrier phase and a weighting factor for one of the M Rake fingers 108. During step 426, the receiver 102 of the present invention weights and coherently combines each of the despread Rake fingers 108. In order to coherently combine, the receiver 102 estimates the phase of the received signal, $\theta_i$ in $i^{th}$ multiple path to produce $\hat{\theta}_i$, which represents the carrier phase. In order to weight the signal, a maximal-ratio combining rule is used. Here, each Rake channel arm 108 (or finger) is weighted according to the gain, $\alpha_i$, in that channel. Hence, channel i is weighted $\hat{\alpha}_i$.

The operation of the receiver 102 during step 426 shall now be described in greater detail.

To coherently receive a signal, the carrier phase must be estimated for each Rake finger 108 before combining. Consider the phase vector $\theta = (\theta_1, \theta_2, \ldots, \theta_L)$ and the attenuation vector $\alpha = (\alpha_1, \alpha_2, \ldots, \alpha_L)$. The optimum receiver maximizes the conditional probability density function (p(r|$a_k$, $\underline{\alpha}$, $\underline{\theta}$, $\Delta f$) which is the likelihood function for a particular observation $r = (r_1(t), r_2(t), \ldots, r_L(t))$ over an observation interval (see *Digital Communications* by Proakis, cited above). Consider N observations (i.e. N samples) of the received signal in an observation interval. The present invention assumes that the channel is time-invariant over the observation interval spanning several symbol periods, and the components of the phase vector $\theta_i$ are mutually independent.

Under these assumptions, each of the ML phase estimators 310 obtains $(\hat{\underline{\theta}})$ of $(\underline{\theta})$ by solving $L(\hat{\underline{\theta}}) = \max\{L(\hat{\underline{\theta}})\}$ where $(\hat{\underline{\theta}})$ denotes the set of all possible values $(\hat{\underline{\theta}})$ can take on.

This yields the following solutions for cos() and sin() at time k:

$$\cos(\hat{\theta}_i) = A \sqrt{E_s/T_b} \; \alpha_i \sum_{k=0}^{N-1} Re\{r_i(k)d^*(k)\}$$

and $$\sin(\hat{\theta}_i) = A \sqrt{E_s/T_b} \; \alpha_i \sum_{k=0}^{N-1} Im\{r_i(k)d^*(k)\}$$

The constant A shows that tile estimate is proportional to $\cos(\hat{\theta}_i)$ and $\sin(\hat{\theta}_i)$.

A decision-directed scheme, which is performed by the slicer 112 in step 430, is used to obtain values for d(k), so that the estimate at time k can be based on the preceding N symbols. This modifies the arguments of the summations above to read $$\sum_{m=1}^{N} Re\{r_i(k-m)\hat{d}^*(k-m)\}$$

and likewise for the imaginary term. Here, $\hat{a}$(k-m) denotes the output of the slicer 112 m symbols ago.

Thus, each of the phase estimators 310 generates an estimate of the carrier phase correction term $v_i(k)$ of the form:

$$v_i(k) = C_0 e^{j\hat{\theta}_i} = A\sqrt{\frac{E_s}{T_b}} \cdot a_i \left( \sum_{k=0}^{N-1} Re\{r_i(k)d^*(k)\} + jIM\{r_i(k)d^*(k)\} \right)$$

$$= A\sqrt{\frac{E_s}{T_b}} \; a_i \sum_{K=0}^{N-1} r_i(k)d^*(k)$$

at time k.

In step 428, the ML corrected samples are fed to a maximal ratio combiner, such as multipliers 316, to be weighted. That is, the phase correction and weighting applied to the received despread signal requires a rotation in the complex plane achieved by complex multiplying the signals $r_i(k)$ with the signals $v_i^*(k)$ using the multipliers 316 in accordance with the following equation:

$$y_i(k) = r_i(k) \cdot v_i^*(k)$$

The signals $y_i(k)$ represent the output of the multipliers. Also in step 428, the signals $y_i(k)$ are summed in a summation device, such as the maximal-ratio diversity combiner 318, as indicated in the following equation:

$$z(k) = \sum_{i=1}^{M} y_i(k)$$

Step 428 shall now be described in greater detail.

The principle underlying the Rake receiver 108 is maximal-ratio weighting of the $i^{th}$ multipath before combining in order to maximize the signal-to-noise ratio of the output statistic. This is generally discussed, for example, in *Digital Communications* by Proakis, cited above. In order to achieve this, the $i^{th}$ Rake branch must be weighted according to the strength of the path, $a_i$. The phase estimators 310 of the present invention each yields $a_i$ as a scaling factor when the complex vector is produced. This value of $a_i$ is accurate only as long as the decisions $\hat{d}(k)$ by the slicer 112 are not in error since the computations for the phase estimators 310 are performed in a decision directed fashion (as indicated by the feedback line from the slicer 112 to the phase estimators 310).

Hence, in step 428, the $i^{th}$ Rake arm 108 is not only rotated, but also weighted according to its strength, which is exactly what is required for maximal-ratio combining. The ML-phase estimators 310 of the present invention generate the combining factor for each of the Rake arms 108, and hence serves as a channel gain estimator as well. Note that this was possible only because of using planar (i.e., I/Q) techniques.

In step 430, the output of the summation device 318 is fed to a decision device such as a slicer 112. This output of the summation device 318 represents the signal transmitted from the transmitter (not shown) and received by the receiver 102, as processed by the A/D converter 104, the downconverter 106, the Rake fingers 108, and the combiner/phase estimator 110 (as described above).

As will be appreciated, the signal transmitted from the transmitter to the receiver 102 is corrupted to some degree by noise. Therefore, the received signal is a corrupted representation of the signal transmitted by the transmitter.

In step 438, the slicer 112 processes the signal received from the summation device 318 and makes a symbol decision. As noted above, the received signal is a corrupted representation of the signal transmitted by the transmitter. During step 438, the slicer 112 essentially makes an estimate as to the symbol content of the received signal. The structure and operation of slicers are well known, and any well known slicer could be used in the receiver 102 of the present invention. After performing step 438, control returns to step 406.

The series of steps beginning with step 432 are also processed after the performance of step 430 (these steps are preferably processed concurrently with the processing of step 438). In these steps, the receiver 102 compensates for any possible frequency offset in the received signal. Any frequency offset will manifest itself identically in each Rake arm 108, since frequency offset is "introduced" prior to the M-branch signal splitting. The receiver 102 thus needs to estimate any frequency offset $\Delta f$, and track any slowly varying frequency drifts with a frequency tracking system. During step 432, the receiver 102 estimates frequency offsets $\Delta f$. During steps 434 and 436, the receiver 102 processes the estimated frequency offsets and transfers these processed, estimated frequency offsets to the downconverter 106. As discussed above, the downconverter in step 408 uses the processed, estimated frequency offsets to compensate for any frequency offset in the received signal. Steps 432–436 shall now be described in detail.

In step 432, the ML frequency offset estimator 114, which receives the output of the slicer 112, produces frequency offset error estimates. Step 432 is described in detail below.

The frequency offset estimator 114 preferably operates by determining a maximum likelihood (ML) estimate, and then using the maximum likelihood estimator to correct the frequency offset. The ML estimate $\hat{\Delta f}$ is obtained by solving $L(\hat{\Delta f}) = \max\{L(\overline{\Delta F})\}$ where $\overline{\Delta f}$ denotes the set of all possible values $\Delta f$ can take on. The present invention assumes that $\Delta f T_s < 1$. Observations are made on the maximal-ratio-combined Rake output signal since (1) a signal of sufficiently large signal-to-noise ratio is required, and (2) the effect of a frequency offset $\Delta f$ is identical in every arm. $N_F$ samples are observed in the estimation observation period.

Taking the derivative of the log-likelihood, and proceeding in an identical fashion as that described for the phase estimator 310, the estimate $\hat{\Delta f}$ is given by:

$$\sin(\pi \hat{\Delta f}(k)T(N_F + 1)) = \sum_{l=0}^{N_F-1} Im\{z(k-l)\hat{d}^*(k-l)\}$$

-continued
$$\cos(\pi \hat{\Delta f}(k)T(N_F+1)) = \sum_{l=0}^{N_F-1} Re\{z(k-l)\hat{d}^*(k-l)\}$$

which can be written as:

$$e^{j\pi \hat{\Delta f}(k)T(NF+1)} = \sum_{l=0}^{N_F-1} z(k-l)d(k-l)$$

This computation involves an accumulator.

This result can also be written as follows:

$$\hat{\Delta f}(k) = \frac{1}{2\pi T_s(N+1)} \tan^{-1}\left\{\frac{\sum_{l=0}^{N_F-1} Im\{z(k-l)\hat{d}^*(k-l)\}}{\sum_{l=0}^{N_F-1} Re\{z(k-l)\hat{d}^*(k-l)\}}\right\}$$

This latter form involves an accumulator, a division, an arctangent operation, followed by another division. Since the possible domain for $\arctan\Theta$ ranges from $-\infty$ to $\infty$, and the range is restricted to $(-\pi/2, \pi/2)$, a table look-up for arctan would be feasible if high accuracy is restricted to the range where $\Delta f T_s < 1$. This implies a certain range of frequency offsets for which the frequency offset estimator 114 produces an accurate estimate.

As noted above, during steps 434 and 436, the receiver 102 processes the estimated frequency offsets and transfers these processed, estimated frequency offsets to the downconverter 106. Steps 434 and 436 shall now be described in detail.

In stop 434, signals representing the frequency error estimates are transferred to the digital filter 118. The digital filter 118 is used to lowpass filter the frequency error signal to provide an estimate not heavily corrupted by noise.

In step 436, signals representing the filtered frequency error estimates are transferred from the digital filter 118 to the NCO 120. The NCO 120 uses the filtered frequency error estimates to produce a frequency correct term. The NCO 120 receives a frequency control word from the output of the filter 118. This word, described by $$f(e^{j\pi \hat{\Delta f}(k)T(NF+1)})$$

where f() is an implementation dependent mathematical function, and where the outcome of f() is fed to the NCO 120 to produce $$e^{-j2\pi \hat{\Delta f}(k)}$$

The downconverter 106 takes this signal as one input, and the received input signal, and complex multiplies them to produce an output signal with the frequency offset corrected.

Signals 150 representing the frequency correction term are transferred to the downconverter 106. As described above, in step 408 the downconverter 106 performs frequency offset correction by modifying the complex digital signal 156 using the frequency correction term signal 150 generated by the NCO 120. Preferably, the downconverter 106 complex multiplies the complex digital signal 156 using the frequency correction term signal 150 to perform frequency offset correction.

After performing step 436, control returns to step 406.

4. Correlators

As discussed above, each of the Rake fingers 108 includes a correlator comprising a multiplier 312, 314 and an intergrator 306, 308. These correlators shall now be described in greater detail.

Figure 6:
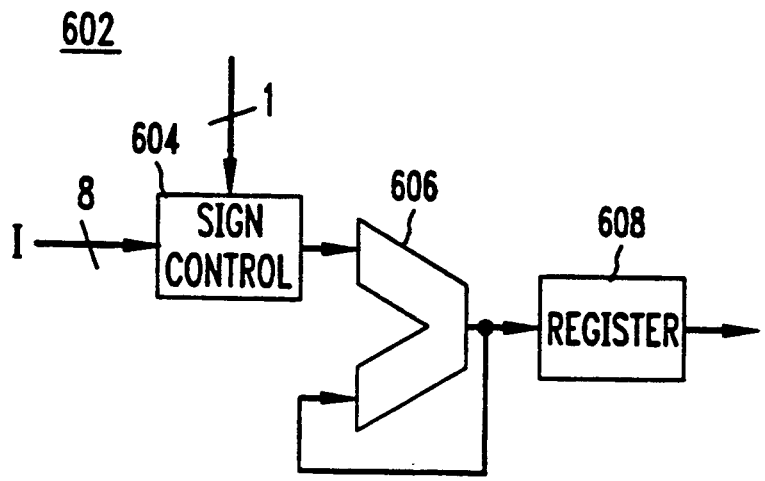
FIG. 6 is a structural block diagram of a correlator in accordance with a preferred embodiment of the present invention.

By virtue of the fact that the receiver's local code is stored as a 1-bit sequence of chips (representing +1 and −1), the received B-bit A/D-samples (at the rate $M/T_c$) are accumulated, with the local code bits serving as a control signal to toggle the sign bits of the A/D output words. This is shown in FIG. 6, which is a block diagram of a correlator 602 in accordance with a preferred embodiment of the present invention. The correlator 602 includes a sign control circuit 604 (representing the multipliers 312, 314), an accumulator 606 (representing the intergraters 306, 308), and a register 608.

If $G_c$ gates are required for an I/Q correlator block (i.e., two correlators), using B=1 and M=2, then $G_cBM$ gates are required for a B-bit-wide signal path using M samples per chip. This is further described in "Synchronization Systems for Spread-Spectrum Receivers" by Subramanian, cited above.

In order to be able to span a wide variety of data rates, a bit-parallel approach is preferably used. The bit parallel structure can be clocked at the input sample rate, thereby allowing high data rates. It can be argued that for lower rate applications like low-rate voice, it is not necessary to employ a bit-parallel approach. After all, a bit-serial structure will allow the receiver to perform correlations and accumulations serially, and for the same hardware complexity, the multiplier needs to be clocked W times faster (recall that W is the processing gain). This will cause an increase power consumption. The exact amount of this increase depends on the data rates, chipping rates, and system clock rate for each section of the receiver.

To reduce the required multiplier clock speed, and thereby lower power consumption, two or more multiplier units in parallel can be employed. This will reduce the required multiplier clock speed, but dramatically increase the gate count.

5. Implementation of the Maximum Likelihood Estimators

From the above discussion, it is apparent that the computations performed by the phase estimators 310, the combiner 318, and the frequency offset estimator 114 are predominantly of the following form:

$$\sum_{l=0}^{J} Re\{z(k-l)\hat{d}^*(k-l)\}$$

or of the form $$\sum_{l=0}^{J} Im\{z(k-l)\hat{d}^*(k-l)\}$$

In some cases, the computations use the despread $i^{th}$ arm Rake output, $r_i(k)$. In all cases the computation structure is clear. That is, the computations involve complex multiplications and accumulators.

Given two complex numbers $g_r+jg_i$ and $t_r+jt_i$, the real part of the product of the two numbers is as follows:

$$Re(gt)=g_rt_r-g_it_i$$

the imaginary part is denoted by:

$$Im(gt)=g_rt_i+g_it_r$$

The phase and weighting factor estimators 310 and the frequency offset estimator 114 require accumulating N of the above real or imaginary parts of products. These form the bulk of the computations in the receiver 102 of the present invention.

Figure 2:
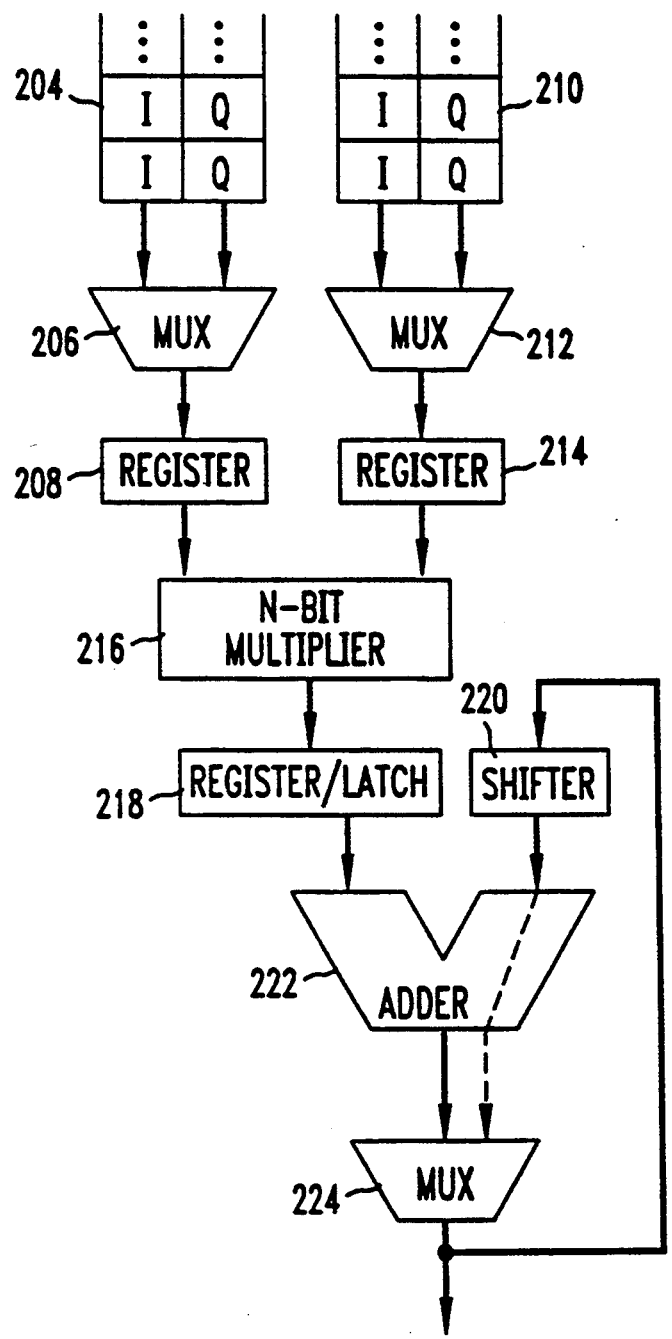
FIG. 2 is a structural block diagram of a preferred computation unit of the present invention.

FIG. 2 is a block diagram of a preferred computational unit 202 which is used to implement the phase estimators 310 and the frequency offset estimator 114 of the present invention. The computation unit 202 allows for extremely efficient execution of computations required in a spread-spectrum receiver. Since the computations performed by the estimators 310, 114 and the combiner 318 are regular in nature, a single computation unit 202 can be used to perform these computations.

The complex samples at any point in the receiver 102 can be processed to produce phase, frequency, or ML-branch weights as specified by the above algorithms by using the computation unit 202.

The complex samples are stored in RAM locations 204, 210, as I/Q pairs. Multiplexers 206, 212 select the I or Q sample corresponding to a particular time instant, and feed the sample to a multiplier 216 (via registers 208, 214) followed by an accumulator or adder 222 (via a latch 218). In a first computational cycle, the multiplier 216 computes either the product of two real components, two imaginary components, or a cross product component. In a second computational cycle, the calculation is completed to produce the result Re() or Im() of a complex product.

Finally, using a loop counter involving a multiplexer 224 and a shifter 220 (which maintains a count), the accumulator 222 computes, for example, the following:

$$\sum_{l=0}^{J} Re\{z(k-l)\hat{d}^*(k-l)\}$$

This computation results in accumulating J samples to produce entries to an arctan lookup table.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A spread spectrum receiver for use in a spread spectrum communication system, said spread spectrum receiver comprising:

an analog-to-digital converter for receiving an analog spread spectrum signal, and for converting said received analog signal to a digital signal, said received analog signal having a plurality of both main and multipath return signals of varying signal strengths;

a frequency offset correction device, electrically connected to said analog-to-digital converter, for modifying said digital signal in accordance with a frequency correction term signal to thereby correct for frequency offset in said received analog signal;

searching means for receiving said modified digital signal, and for searching through said modified digital signal to identify M of said main and multipath return signals having the strongest signal strengths; and processing means, electrically connected to said searching means and said frequency offset correction device, for processing said identified main and multipath return signals in accordance with predetermined maximum likelihood techniques to thereby generate said frequency correction term signal.

2. The spread spectrum receiver of claim 1, wherein said searching means comprises a plurality of correlators each accumulating signal strength information for one of said main and multipath return signals of said received analog signal, said spread spectrum receiver also comprising a plurality of pseudo noise (PN) code generators each electrically connected to one of said correlators, said PN code generators comprising means for generating PN codes with different offsets, wherein said PN codes are compared to values accumulated by said correlators to thereby identify said M of said main and multipath return signals having the strongest signal strengths.

3. The spread spectrum receiver of claim 1, wherein said processing means comprises a plurality of phase estimators, electrically connected to said searching means, for processing said identified main and multipath return signals in accordance with predetermined maximum likelihood techniques to thereby generate carrier phase correction estimates and weighting factors for said identified main and multipath return signals.

4. The spread spectrum receiver of claim 3, wherein said processing means also comprises a plurality of phase correcting circuits, electrically connected to said phase estimators, for correcting for respective phase offsets in said identified main and multipath return signals by modifying said identified main and multipath return signals as a function of said carrier phase correction estimates.

5. The spread spectrum receiver of claim 4, wherein said processing means also comprises weighing means, electrically connected to said phase correcting circuits, for using said weighing factors to weight said phase corrected main and multipath return signals in accordance with signal strength, said processing means further comprising a maximal-ratio diversity combiner, electrically connected to said weighing means, for combining said weighted main and multipath return signals to thereby produce a maximal-ratio combined return signal.

6. The spread spectrum receiver of claim 5, wherein said processing means also comprises a frequency offset estimator, electrically connected to said maximal-ratio diversity combiner to process said maximal-ratio combined return signal in accordance with predetermined maximum likelihood techniques to thereby generate said frequency correction term signal.

7. The spread spectrum receiver of claim 5, further comprising a slicer, electrically connected to said maximal-ratio diversity combiner, for estimating a symbol content of said maximal-ratio combined return signal.

8. A method of receiving spread spectrum signals, comprising the steps of:
(a) receiving an analog spread spectrum signal having a plurality of both main and multipath return signals of varying signal strengths;
(b) converting said received analog signal to a digital signal;
(c) modifying said digital signal in accordance with a frequency correction term signal to thereby correct for frequency offset in said received analog signal;
(d) searching through said modified digital signal to identify M of said main and multipath return signals having the strongest signal strengths; and
(e) processing said identified main and multipath return signals in accordance with predetermined maximum likelihood techniques to thereby generate said frequency correction term signal.

9. The method of claim 8, wherein step (e) comprises the steps of:

processing said identified main and multipath return signals in accordance with predetermined maximum likelihood techniques to thereby generate carrier phase correction estimates and weighting factors for said identified main and multipath return signals;
correcting for respective phase offsets in said identified main and multipath return signals by modifying said identified main and multipath return signals as a function of said carrier phase correction estimates;
using said weighting factors to weight said phase corrected main and multipath return signals in accordance with signal strength; and
combining said weighted main and multipath return signals to thereby produce a maximal-ratio combined return signal.

10. The method of claim 9, wherein step (e) further comprises the step of processing said maximal-ratio combined return signal in accordance with predetermined maximum likelihood techniques to thereby generate said frequency correction term signal.

* * * * *